Figure 1:
Figure 2:
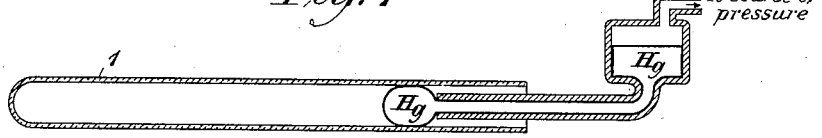

July 14, 1936.   H. NYQUIST   2,047,427
PRESSURE CONTACTOR
Filed June 21, 1935   2 Sheets-Sheet 1

INVENTOR
H. Nyquist
BY
ATTORNEY

July 14, 1936.    H. NYQUIST    2,047,427
PRESSURE CONTACTOR
Filed June 21, 1935    2 Sheets-Sheet 2
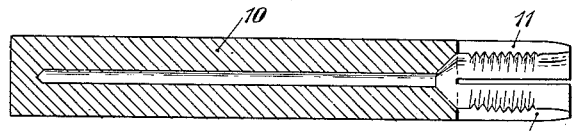 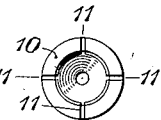
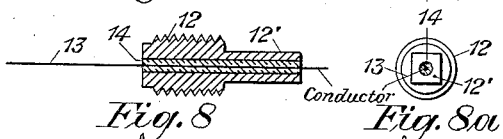 
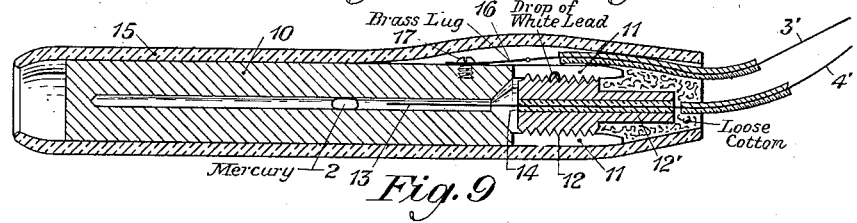
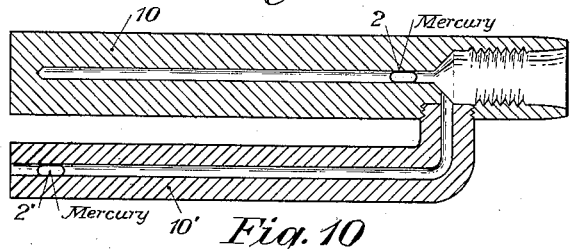
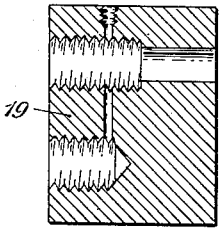 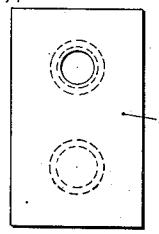 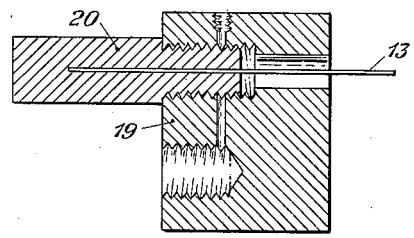
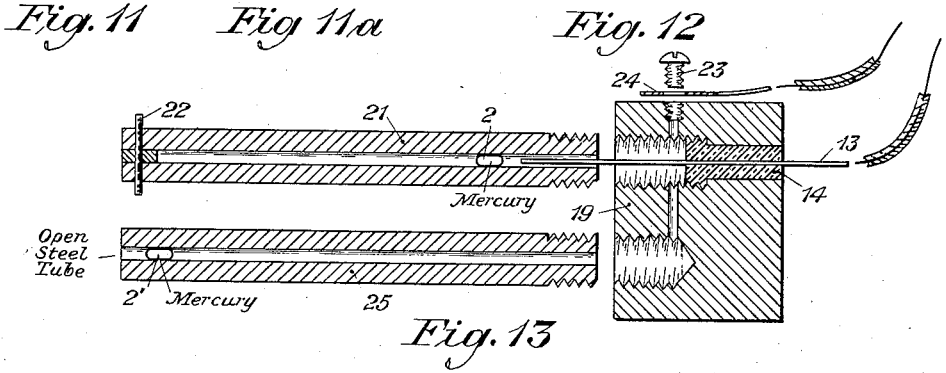
INVENTOR
H. Nyquist
BY
ATTORNEY Patented July 14, 1936

2,047,427

UNITED STATES PATENT OFFICE 2,047,427

PRESSURE CONTACTOR

Harry Nyquist, Millburn, N. J., assignor to American Telephone and Telegraph Company, a corporation of New York Application June 21, 1935, Serial No. 27,821

12 Claims. (Cl. 200—81)

This invention relates to the location of faults in cables and the like, and more particularly to the location of sheath faults by methods involving the maintenance of a cable under pressure of gas or other fluid. With greater particularity, the invention relates to pressure contactors for use in the practice of such methods.

In pressure testing of cables, the cable is divided into sections by plugs, which block the passage of gas beyond certain points, and a cable section is normally filled with gas to a pressure of, for example, 9 pounds above the normal atmospheric pressure when the pressure within the cable is at a temperature of, for example, 60° F. It will be understood that a fault, or break, in the sheath results in the escape of gas from the cable section in which it occurs, and further it will be understood that it is desirable that some indication or alarm be given when the pressure in a section falls to some value below that normally maintained—for example, to 6 pounds above the normal atmospheric pressure at the given cable temperature.

The indication contemplated in connection with the present invention involves a contactor located at each of a plurality of points along the cable and designed to complete, upon operation, an electrical circuit through an indicating device such as an alarm bell or a visual signal device, the circuit usually including a pair of conductors in the cable which lead to an appropriate attended station. The contactor is, of course, located within the cable sheath or within a chamber communicating with the cable sheath, and makes contact and completes the indicating circuit when the cable pressure at the particular point served by the contactor falls to the predetermined value. It has been proposed heretofore to utilize for this purpose contactors which represent adaptation of the well-known Bourdon tube. A gauge or contactor of that type is somewhat expensive; accordingly, it is, in general, not feasible to place the devices as close together as is desirable for the rapid location of sheath breaks. It has been proposed to space the contactors at a distance of 10,000 feet, with the cable pressure at 9 pounds, the contactors being designed to indicate a pressure drop to 6 pounds; under such conditions the time required for the detection and location of a major break occurring midway between two contactors is about 10 hours.

If, however, the contactors can be placed closer together, the time required for detection will be reduced approximately as the square of the distance. For example, if the spacing interval is reduced from 10,000 feet to 1,000 feet, the time required for detection will be reduced to one part in 100 or to about 6 minutes.

It is an object of the present invention to provide a contactor which can be constructed so inexpensively that one can be used at every splice if such spacing is desirable; thus provision is made for the rapid detection and location of cable sheath breaks.

Another object of the invention is to provide a contactor which will not be subject to false operation because of response to pressure decrease due to change of temperature within the cable, which pressure decrease obviously has no relation to the condition of the cable sheath.

Various features and advantages of the invention will be brought out by a consideration of the following description.

In general, the applicant's improved contactor comprises a tubular member closed at one end and exposed at the other end to the pressure in the cable, a mercury drop filling the cross-section of the tubular member and designed to travel longitudinally therein with variation of the pressure in the cable, and two electrodes so disposed that the mercury drop will short-circuit them upon taking a position in the tubular member resulting from a pressure in the cable at or below the predetermined value (6 pounds above the normal atmospheric pressure at the given cable temperature, for example). It will be understood that the short-circuiting of the electrodes completes an indicating or alarm circuit such as one including the conductors of a pair in the cable and a suitable bell or visual signal device located at an attended station.

The following detailed description covers a suitable contactor constructed in accordance with the principles of the invention and the essentials indicated hereinabove, and also several modified embodiments of the inventive ideas. The description is to be read with reference to the accompanying drawings, in which:

Figure 1 shows the essential elements of a contactor having its tubular member constructed of glass; Figs. 2, 3, 4 and 5 indicate various steps in the construction and calibration of such a contactor, Fig. 5 disclosing the completed device and its association with suitable indicating apparatus, which may be at a remote point; Fig. 6 indicates a modification of the device of Fig. 5 designed to overcome certain possible disadvantages of that device;

Figs. 7, 7a, 8, 8a and 9 indicate the construction of a contactor having a tubular member of metal suitably drilled, Fig. 9 showing the completed device; Fig. 10 indicates a modification of the metal contactor corresponding to the modification of Fig. 6 in the case of the contactor with glass tubular member; and Figs. 11, 11a, 12 and 13 disclose an alternative metal construction of the contactor, in which tubing is used in place of the drilled member or members of Figs. 7 to 10, inclusive.

In Fig. 1, there are indicated the essential elements of the applicant's contactor. The tube 1, which, in this case, is of glass, is closed or sealed at the left end and is open at the right end, it being understood that the right end is exposed to the pressure within the cable. A drop 2 of mercury—or possibly other liquid which is electrically conductive and will not wet the walls of the tube—is of such size as to fill completely the interior cross-section of the tube. Two separated wires 3 and 4 serve as electrodes and will be short-circuited by the drop 2 when it takes certain positions in the tube. In accordance with the disclosure of Fig. 1, if the drop 2 moves to the right to reach or pass beyond the point marking the left end of the wires 3 and 4, the short-circuit will be effected. It will be understood in general that the wires 3 and 4 are so disposed that the mercury drop 2 will just make contact with the wires when the pressure in the cable is 6 pounds, for example. With every higher pressure, the mercury drop is removed from the wires and no contact is made. It will be understood that the contactor is to be enclosed within the cable sheath—or at least within a chamber communicating with the cable—at a splice point, and will not be available for external inspection. It will be understood further that the wires or electrodes 3 and 4 are to be connected to a pair in the cable, as will be more fully considered hereinafter.

It is to be noted at the outset that if the temperature in the cable changes, the resultant pressure change will have no effect on the contactor. Since the temperature changes equally on the two sides of the drop 2, the changes of pressure on the two sides are equal and, accordingly, the drop does not move. This feature is highly important since the contactor should not respond to a change of pressure due to temperature change, such a condition representing no escape of gas from the cable section. In other words, the applicant's contactor provides automatic compensation for temperature changes. It will be understood, in view of this discussion, that the applicant's device is, in one sense, one which responds to change of density rather than to change of pressure. Viewed more practically, the device is a pressure contactor which responds to the pressure changes resulting from breaks in the cable sheath and the resultant escape of gas but does not give a false indication when the pressure is changed merely by temperature changes.

Figs. 2, 3, 4 and 5 indicate the manufacture and calibration of the contactor in the form first to be considered, it being understood that the calibration of the device is of considerable importance. It is to be borne in mind in connection with the following discussion that when reference is made to a pressure of 6 pounds, for example, what is meant is 6 pounds at a temperature of 60° F., for example, and correspondingly corrected pressures for other temperatures. Also, it appears desirable to indicate suitable dimensions but it will be understood that the proportions are somewhat distorted in the drawings for the purpose of satisfactory illustration.

As has been indicated hereinabove, the first element of the contactor in this form is the glass tube 1, which may have an inside diameter of .1 inch and the overall length of 4 inches. This tube is closed at one end and open at the other, like the ordinary test tube. The mercury drop 2 is deposited at a definite normal location within the tube by the means schematically indicated in Fig. 2, the location being, for example, 2.5 inches from the closed end and 1.5 inches from the open end. It is important that the mercury drop be of a size sufficient to provide complete sealing of the tube and this may be insured by making a drop of a length equal to twice the diameter, or .2 inch.

Figure 3:
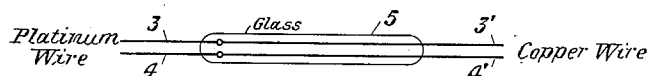

The electrodes and a suitable support for them may be arranged as shown in Fig. 3. The support consists of a glass tube 5 closed at both ends and of such outside diameter as to fit loosely within the main tube 1—that is of a diameter somewhat less than .1 inch. A suitable length for the tube 5 is 2 inches. The electrodes 3 and 4 are sealed through the tube 5 at one end and are preferably made of platinum. These electrodes project from the tube 5 for a distance of about one inch and at the other end they are connected to copper wires 3' and 4', respectively, which are sealed through the tube 5 at the other end in the manner common in lamp manufacture.

Figure 4:
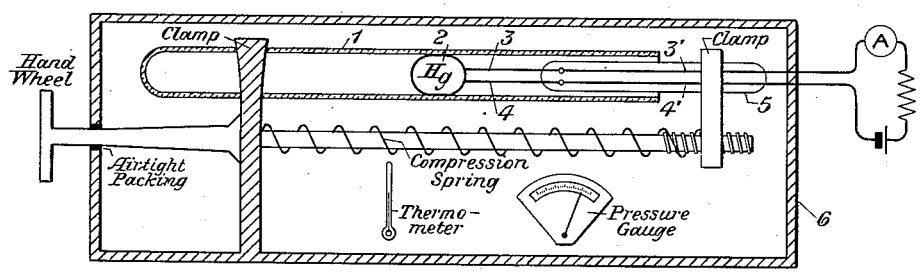

The contactor may be calibrated in the fashion indicated in Fig. 4. The device is enclosed in a sealed chamber, with bounding wall 6, equipped with a thermometer and a pressure gauge whereby fixed temperature and pressure are maintained. This pressure should be the equivalent of 6 pounds at 60° F., for example, but it may be more convenient to use a temperature of 70° F. and a correspondingly greater pressure. The two parts of the device, the main tube 1 and the supporting tube 5, are fixed to two clamps movable with respect to each other, and the relative position is adjusted until contact is just made between the mercury drop 2 and the electrodes 3 and 4, a battery and an ammeter being connected in series with the electrodes and the connecting wires 3' and 4'. When the correct relative position of the parts 1 and 5 has been obtained, the sealed chamber is opened and the two parts are fixed in their relative position by means of glass cement, for example. After the cement has set, the device is removed from the clamps. Of course, it is important that the cement shall not completely seal the opening between the inner and outer tubes since the passage of gas must be provided for.

Figure 5:
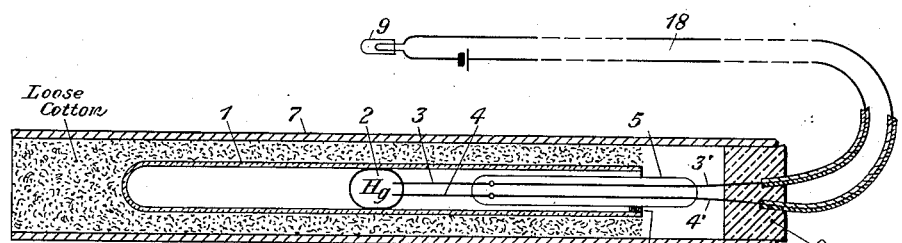
Figure 6:
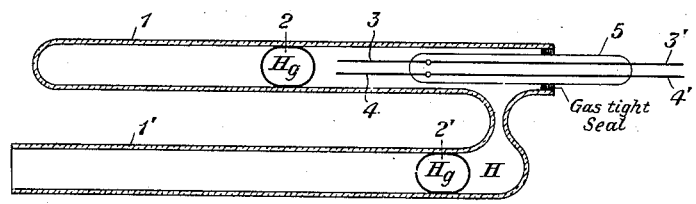

The completed contactor with suitable protective housing is disclosed in Fig. 5. The tube 1, with the electrodes 3 and 4, the supporting member 5, the extending wires 3' and 4' and the mercury drop 2, is surrounded by loose cotton or the equivalent and is inserted in a brass tube 7, about 6 inches long and about .5 inch in diameter. The right end of the tube 7 is closed by a suitable gas-tight stopper 8 and the wires 3' and 4' are let out through this stopper with suitable insulating covering as indicated. Thus, the communication with the surrounding air is had through the left end of the tube 7. This tube 7 serves, of course, to give mechanical protection to the glass parts of the contactor and the loose cotton serves to augment the mechanical protection and also as a filter for the air. This filter prevents contamination of the mercury by accumulating dust. The wires 3' and 4' are connected to a pair of conductors 18 in the cable and a circuit is completed through a battery and indicating device such as a lamp 9, perhaps with the intervention of a suitable relay circuit. It will be understood, of course, that the indication may be given at an appropriate attended office, which may be quite distant from the contactor.

There are two possible disadvantages to the contactor as heretofore described. If the device is calibrated in one position—the horizontal, for example—and is used in any other position, there will be the likelihood of a slight error due to gravity. For example, if the calibration is in the horizontal position and the use is in the vertical position there will be an error of .2 inch of mercury or about .1 pound. While the tube will usually be used in approximately a horizontal position and accordingly give a negligible error at the worst, it is desirable to provide for the modification of the tube as hereinbefore described to eliminate this likelihood of slight error. Again, there is the possibility of contamination of the electrodes or of the mercury due to oxides forming at the time of the sparking when the circuit is opened or closed. This possibility of trouble, though remote, as well as the possible error introduced by the position in which the tube is used, can be eliminated if the device is modified in accordance with the disclosure of Fig. 6. In this arrangement, the main tube 1 has a branch portion 1' joining the main portion near the right end thereof, as specifically disclosed. The right end of the tubular portion 1 is sealed gas-tight and the branch portion 1' is open at its left or free end. The second mercury drop 2' is located in the tubular branch 1' and it will be apparent that a change of pressure will cause the mercury drops 2 and 2' to move in opposite directions. Accordingly, there will be compensation for any effect of gravity on the first drop 2 in the effect on the drop 2'. The space between the two mercury drops may be filled by a reducing gas such as hydrogen and thus any contamination from oxides may be prevented.

A pressure contactor based on the same principle as that already described in detail but considerably more sturdy may be constructed in accordance with the disclosure of Figs. 7, 7a, 8, 8a and 9. In this modified form, the body of the contactor is made of steel or some other metal which is easily machined and is not subject to the formation of amalgams. In Figs. 7 and 7a, there is disclosed the outer member 10 drilled to provide a suitable chamber for the travel of the mercury drop and threaded at its right end to receive the inner part shown in Figs. 8 and 8a. It will be understood that the member 10 corresponds to the tube 1 of the earlier-described contactor while the element of Fig. 8 corresponds to the supporting tube 5. The threads should form a tight fit in order to avoid the possibility of longitudinal motion between the parts after the device is assembled. The tight fit is aided by making the internal threads shown in Fig. 7 smaller in diameter than the external threads of the member 12 shown in Fig. 8 and by dividing the threaded portion of the member 10 by four longitudinal slits 11, as disclosed in Figs. 7 and 7a. The natural elasticity of the material will then come into play to prevent relative longitudinal motion unless there is relative rotation. This inner member, having the threaded portion 12, is equipped with a protruding square portion or shank 12' by means of which the body may be rotated to any desired position. A contact-making steel pin 13 is mounted in the member 12 so as to be accurately centered with respect to the drilled chamber of the member 10 and is surrounded by insulating material 14. It will be understood, of course, that the body of the cylindrical member 10 forms one electrode of the contactor and that the steel pin 13 forms the other.

The completed contactor employing the drilled metal cylinder is shown in Fig. 9. It will be understood that the process of introducing the mercury and of calibrating the device is substantially the same as that described hereinbefore in connection with the form including the glass tube. The member 12, by operation of its extending shank 12', is screwed into the right end of the member 10. After the mercury drop 2 is suitably located and when the calibration is effected to produce a short-circuit between the member 10 and the steel contact pin 13 at the critical pressure, a drop of white lead may be placed in one of the slits. This white lead, on hardening, should prevent subsequent accidental rotation. It is to be understood that the gas enters the contactor through the slits 11. The metal tube 10, since it forms one of the electrodes, is surrounded by an insulating covering 15, which may take the form of a soft rubber tube, and loose cotton may be inserted at the right end of the device for the filtering purpose, discussed hereinbefore. A brass lug 16 is fastened to the tube 10 by a screw 17 and serves to connect the tube or electrode 10 to one extending wire 3'. The contact pin 13 is extended by means of the other connecting wire 4', and it will be understood that these wires lead to a pair in the cable through which the alarm circuit is completed. Suitable insulating covering may be provided for the wires 3' and 4'.

In Fig. 10, there is shown a modification of the device of Fig. 9 which corresponds to the modified glass contactor of Fig. 6. There is joined to the main tubular member 10 a branch tube 10'. The mercury drop 2' travels in the branch portion 10', with change of pressure, in the direction opposite to that taken by the mercury drop 2 in the main portion 10. Thus, any effect of gravity is offset. It is understood, of course, that in the arrangement of Fig. 10 the right end of the tubular member 10 is not slitted since the pressure is effective through the member 10' and not through the right end of the member 10, which must be tightly closed.

It is pointed out that the metal construction of the contactor has certain advantages over the glass construction previously described. First, with the metal construction there is less likelihood of longitudinal motion between the parts, and since such motion is of prime importance in connection with the calibration, it can be seen that the advantage is considerable. Second, with the construction shown in Fig. 9, the steel contact pin 13 can be accurately centered with respect to the cross-section of the tubular member 10; accordingly, the condition of contact-making does not vary with rotation of the device about its axis. Again, the metal construction permits the contact element 13 to be made longer than is feasible with the corresponding members of Fig. 5; accordingly, the hollow cylinder 10 can be made longer than the corresponding element of Fig. 5 and the travel of the mercury drop will be greater per unit change of pressure. On the other hand, it is pointed out that the metal construction has the disadvantage, in comparison with the glass construction, that it is subject to contamination from oxidation.

A metal construction alternative to that just described is disclosed by Figs. 11, 11a, 12 and 13. In this arrangement, there is found the advantage that tubing is employed and thus there is avoided the labor of drilling necessary to the construction specifically described hereinbefore.

Figs. 11 and 11a disclose what may be termed the skeleton of the device. A rectangular steel block 19 is drilled and tapped as indicated. The steel pin 13 may be accurately placed as indicated in Fig. 12. A guide 20 is threaded to fit the threads of the steel block and is further drilled to receive the steel pin. The drilled hole is accurately centered and is drilled to an accurately predetermined depth. The steel pin is free to move longitudinally in the drilled hole but is not loose therein. In the next step, insulating material 14 is moulded around the steel pin 13 as shown in Fig. 13. The guide 20 is then removed.

Fig. 13 indicates the completed device constructed with the metal tubing. The tube 21 is screwed into the upper opening of the skeleton 19 after the mercury drop 2 has been placed in the tube in the manner suggested hereinabove. The left end of the tube 21 is closed and is equipped with a transverse pin 22, or the equivalent, which aids the rotation of the member 21 with respect to the skeleton block 19. By such rotation, the proper calibration is obtained. The screw 23 fastens the brass lug 24 to the block 19. Thus, the two electrodes are formed by the metal path of tube 21 (which is extended through the screw 23 and the lug 24) and the contact pin 13, and suitable extension of this circuit leads to the pair of conductors in the cable and ultimately to the indicating circuit at the attended office. For the purpose of compensation for the effects of gravity, a second tube 25 is screwed into the block 19 and the second mercury drop 2' is placed in this tube after the assembling operation and flushing out with hydrogen. The screw 23, in addition to serving as a connecting member for the lug 24, permits hydrogen gas to be admitted into the portion of the contactor between the two mercury drops. The two openings of the block 19 which are screw-threaded to receive the tubes 21 and 25 are connected by the passage as shown in Figs. 11, 12 and 13.

While the invention has been disclosed in detail in several forms, it is to be understood that such specification is for the purpose of clear illustration and does not limit the scope of the invention, which is defined in the appended claims.

What is claimed is:

1. A contactor for indicating variation of the pressure of a fluid in a cable or the like, including a tubular member, a drop of mercury having a predetermined location in said tubular member and being of such size as to fill the interior cross-section thereof, and an arrangement of electrodes so disposed that they will be short-circuited by said mercury drop when it moves beyond a certain point in said tubular member, said tubular member being sealed on one side of said mercury drop and exposed on the other side thereof to the pressure in the cable or the like.

2. A pressure indicator for use in cables and the like which are maintained under fluid pressure, including a tubular member closed at one end and exposed at the other end to the pressure in the cable or the like, a mercury drop filling the cross-section of said tubular member and designed to travel longitudinally therein, and an arrangement of electrodes so disposed that they will be short-circuited by the mercury drop when the pressure reaches a predetermined value.

3. A device for use in indicating variation of the pressure of a fluid in a cable or the like caused by a break in the cable sheath or the like, including a tubular member, a drop of electrically conductive liquid having a predetermined location in said tubular member and being of such size as to fill the interior cross-section thereof, the liquid being one which will not wet the walls of the tubular member, and an arrangement of electrodes so disposed that they will be short-circuited by said liquid drop when it moves beyond a certain point in said tubular member, said tubular member being closed at one end and exposed on the other side of the liquid drop to the pressure in the cable or the like.

4. A pressure contactor for use in cables maintained under fluid pressure, including a tubular member having a main portion and a portion branching therefrom near one end thereof, the free end of said branch portion being exposed to the cable pressure and the ends proper of said main portion being sealed, a first mercury drop in said main portion of such size as to fill the cross-section thereof, an arrangement of electrodes so disposed that they will be short-circuited by said first mercury drop when it takes any one of certain consecutive positions in said main portion, and a second mercury drop in said branch portion of such size as to fill the cross-section thereof, the branch portion of the tubular member being so disposed with relation to the main portion thereof that the two mercury drops will move in opposite directions with a change of pressure in the cable.

5. A pressure contactor including a glass tube sealed at one end and exposed at the other end to pressure subject to variation, a mercury drop in said tube of such size as to fill the cross-section thereof and designed to travel longitudinally therein with pressure variation, and two electrodes so disposed that the mercury drop will short-circuit them when it moves beyond a predetermined point in said tube.

6. A pressure contactor including a glass tube sealed at one end and exposed at the other end to pressure subject to variation, a mercury drop in said tube of such size as to fill the cross-section thereof and designed to travel longitudinally therein with pressure variation, two electrodes extending into said tube from the exposed end thereof, and a supporting member for said electrodes designed to fix the position thereof with respect to the tube, whereby the mercury drop will short-circuit the electrodes when the pressure falls to or below a predetermined value.

7. A pressure contactor comprising a glass tube sealed at one end and open at the other end, a mercury drop having a predetermined normal location in said tube and being of such size as to fill the interior cross-section thereof, two electrodes so disposed that the mercury drop will short-circuit them when it moves from its normal position toward the open end of said tube by a predetermined degree, and an infrangible tube surrounding said glass tube and having one end open and the other end sealed.

8. A pressure contactor comprising a glass tube sealed at one end and open at the other end, a mercury drop having a predetermined normal location in said tube and being of such size as to fill the interior cross-section thereof, two electrodes so disposed that the mercury drop will short-circuit them when it moves from its normal position toward the open end of said tube by a predetermined degree, an infrangible tube surrounding said glass tube and having one end open and the other end sealed, two wires extending said electrodes and passing through the closed end of the surrounding tube, and packing means in said surrounding tube for loosely supporting the glass tube therein and for filtering the air as it passes to the open end of said glass tube.

9. A pressure contactor including a glass tubular member having a main portion and a portion branching therefrom near one end thereof, the free end of said branch portion being exposed to pressure subject to variation and the ends proper of said main portion being sealed, a first mercury drop in said main portion of such size as to fill the cross-section thereof and designed to travel longitudinally therein with pressure variation, two electrodes extending into the main portion of said tubular member from the end nearer the branch and so disposed as to be short-circuited by said first mercury drop as it approaches said end to a predetermined degree, and a second mercury drop in the branch portion of said tubular member of such size as to fill the cross-section thereof and designed to travel longitudinally therein with pressure variation, the branch portion of said tubular member being so disposed with relation to the main portion thereof that the two mercury drops will move in opposite directions with a change of pressure.

10. A pressure contactor including a tubular metal member closed at one end and exposed at the other end to pressure subject to variation, a mercury drop in said tubular member of such size as to fill the interior cross-section thereof and designed to travel longitudinally therein from a predetermined normal position with pressure variation, a metal contact pin extending into the tubular member from the exposed end thereof, and means for supporting said contact pin in a position with respect to the tubular member such that the mercury drop will touch the pin as well as the tubular member when the pressure falls to a predetermined value.

11. A pressure contactor including a tubular metal member closed at one end and exposed at the other end to pressure subject to variation, a mercury drop in said tubular member of such size as to fill the interior cross-section thereof and having a predetermined normal location therein, a metal contact pin extending into the tubular member from the exposed end thereof, means for supporting said contact pin in a position with respect to the tubular member such that the mercury drop will touch the pin as well as the tubular member when it travels from its normal position toward the exposed end of the tubular member by a predetermined distance, an electrical conductor and means for connecting same to said tubular member, and an electrical conductor extending the path formed by said contact pin.

12. A pressure contactor including a tubular metal member closed at one end and exposed at the other end to pressure subject to variation, a mercury drop having a predetermined normal location in said tubular member and being of such size as to fill the interior cross-section thereof, a metal contact pin extending into the exposed end of the tubular member and centered with respect thereto, means for supporting said contact pin in a longitudinal position with respect to the tubular member such that the mercury drop will make contact between the tubular member and said pin when the pressure falls to a predetermined value, and an insulating member surrounding said tubular member.

HARRY NYQUIST.